US010596646B2

(12) United States Patent
Campbell et al.

(10) Patent No.: US 10,596,646 B2
(45) Date of Patent: Mar. 24, 2020

(54) SAWBENCHING ASSEMBLY AND METHOD

(71) Applicant: Idaho Forest Group, LLC, Coeur d'Alene, ID (US)

(72) Inventors: Richard William Campbell, Priest River, ID (US); Jeremy Noel Davis, Sagle, ID (US)

(73) Assignee: Idaho Forest Group, LLC, Coeur d'Alene, ID (US)

( * ) Notice: Subject to any disclaimer, the term of this patent is extended or adjusted under 35 U.S.C. 154(b) by 114 days.

(21) Appl. No.: 15/945,653

(22) Filed: Apr. 4, 2018

(65) Prior Publication Data

US 2019/0308263 A1    Oct. 10, 2019

(51) Int. Cl.
*B23D 63/18*    (2006.01)

(52) U.S. Cl.
CPC .................................... *B23D 63/18* (2013.01)

(58) Field of Classification Search
CPC ....................................................... B23D 63/18
USPC ........................................ 76/25.1, 26, 48, 49
See application file for complete search history.

(56) References Cited

U.S. PATENT DOCUMENTS

| | | | | |
|---|---|---|---|---|
| 372,669 | A * | 11/1887 | Gowen | |
| 399,366 | A * | 3/1889 | Whitehill | |
| 501,769 | A * | 7/1893 | Dillon | |
| 1,692,997 | A * | 11/1928 | Roberts | B23D 63/18 451/236 |
| 3,964,348 | A * | 6/1976 | Dawson | B23D 63/18 76/26 |
| 4,107,983 | A * | 8/1978 | Dawson | B23D 63/18 73/794 |
| 4,138,908 | A * | 2/1979 | Kampmann | B23D 63/18 72/421 |
| 5,269,205 | A * | 12/1993 | Oppliger | B21H 1/02 72/179 |
| 5,522,283 | A * | 6/1996 | Brown | B23D 63/18 76/25.1 |
| 5,908,989 | A * | 6/1999 | Beck | B23D 63/18 73/828 |
| 6,823,759 | B2 * | 11/2004 | Hoffman | B23D 63/18 76/25.1 |
| 2004/0025640 | A1 * | 2/2004 | Martin | B23D 63/18 76/25.1 |
| 2019/0308263 | A1 * | 10/2019 | Campbell | B23D 63/18 |

* cited by examiner

*Primary Examiner* — Hwei-Siu C Payer
(74) *Attorney, Agent, or Firm* — Haynes Beffel & Wolfeld LLP; Andrew L. Dunlap

(57) ABSTRACT

A sawbenching assembly for reworking a sawblade supported by an anvil to flatten the sawblade is provided. The assembly includes an articulated tool arm with a tool arm support, and a scissors linkage arm having first and second ends, the first end pivotally connected to the tool arm support for rotation about a first axis, the second end vertically movable. The assembly also includes a user-operated actuation device connected to the articulated tool arm, and a hammer assembly pivotally connected to the second end of the scissors linkage arm for rotation about a second axis and vertical movement with the second end of the scissors linkage arm, the hammer assembly having a user-actuated hammer with an impact surface positionable at positions on the sawblade by three-dimensional manipulation of the hammer assembly supported by the articulated tool arm. The user-actuated hammer is actuated in response to engagement of the actuation device.

20 Claims, 2 Drawing Sheets

SAWBENCHING ASSEMBLY AND METHOD

BACKGROUND OF THE INVENTION

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Saws used to cut lumber typically use circular saw blades or band saw blades. In any case it is extremely important that the saw blades be periodically reworked to flatten them, commonly by pounding out bumps, high areas or other unevenness in the sawblade. This procedure is commonly referred to as sawbenching. This is important from both a safety standpoint and to reduce the amount of wood lost when cutting the wood. Sawbenching can also be used to tension a sawblade by creating stresses in the sawblade which counteracts stresses induced during use. Sawbenching is typically conducted by very experienced workers called saw filers or saw doctors.

Manual sawbenching is carried out by the saw filer placing the sawblade on an anvil, and then finding and marking the areas needing to be reworked using a straight edge. A hammer is then used to pound on the marked areas. The straight edge is once again be used to check the results. The process is repeated as necessary.

BRIEF SUMMARY OF THE INVENTION

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The invention is directed to a sawbenching assembly for reworking a sawblade supported by an anvil to flatten the sawblade, and a method of operating the sawbenching assembly.

A first example of the sawbenching assembly for reworking a sawblade supported by an anvil to flatten the sawblade includes an articulated tool arm comprising a tool arm support, and a scissors linkage arm having first and second ends, the first end pivotally connected to the tool arm support for rotation about a first axis, the second end movable generally vertically. The sawbenching assembly further includes a user-operated actuation device connected to the articulated tool arm, and a hammer assembly pivotally connected to the second end of the scissors linkage arm for rotation about a second axis and generally vertical movement with the second end of the scissors linkage arm, the hammer assembly having a user-actuated hammer with an impact surface positionable at chosen positions on the sawblade by three-dimensional user manipulation of the hammer assembly supported by the articulated tool arm. The user-actuated hammer is actuated in response to a user engaging the user-operated actuation device.

Another example of the sawbenching assembly for reworking a sawblade supported by an anvil to flatten the sawblade includes an articulated tool arm comprising a tool arm support, a scissors linkage arm assembly comprising first and second pivot joints connected by parallel arms at the first and second ends of the parallel arms, the first and second pivot joints defining first and second generally vertical pivot axes, the first pivot joint mounted to the tool arm support, the parallel arms rotatable about the first pivot axis, and the second ends of the parallel arms movable in a generally vertical direction while maintaining the generally vertical orientation of the second pivot axis. The sawbenching assembly further includes a forearm having an inner end mounted to the second pivot joint for generally vertical movement with the second pivot joint and rotation about the second pivot axis, and a user-operated actuation device connected to the articulated tool arm. The sawbenching assembly also includes a hammer assembly mounted to and supported by the articulated tool arm at the outer end of forearm, the hammer assembly having a user-actuated hammer with a convex impact surface positionable at chosen positions on the sawblade by three-dimensional user manipulation of the hammer assembly supported by the articulated tool arm, wherein the user-actuated hammer is actuated in response to a user engaging the user-operated actuation device.

An embodiment of the present invention also includes a method of operating the sawbenching assemblies described above. A particular embodiment of the method includes placing a sawblade on a support surface of an anvil, checking the sawblade for any unevenness, noting the location of an unevenness, accessing a sawbenching assembly, the sawbenching assembly comprising an articulated tool arm and a hammer assembly, the articulated tool arm comprising a tool arm support, and a scissors linkage arm having first and second ends, the first end pivotally connected to the tool arm support for rotation about a first axis, the second end movable generally vertically, and the hammer assembly pivotally connected to the second end of the scissors linkage arm for rotation about a second axis and generally vertical movement with the second end of the scissors linkage arm, the hammer assembly having a user-actuated hammer with an impact surface positionable at chosen positions on the sawblade by three-dimensional user manipulation of the hammer assembly supported by the articulated tool arm. The method further includes positioning the user actuated hammer at the noted location on the sawblade by manipulation of the articulated tool arm with the weight of the hammer assembly being at least partially supported by the articulated tool arm, actuating the hammer causing the hammer to strike the sawblade at the noted location, rechecking the sawblade at the noted location for any improvement in the unevenness, and repeating the positioning, actuating and rechecking as needed Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
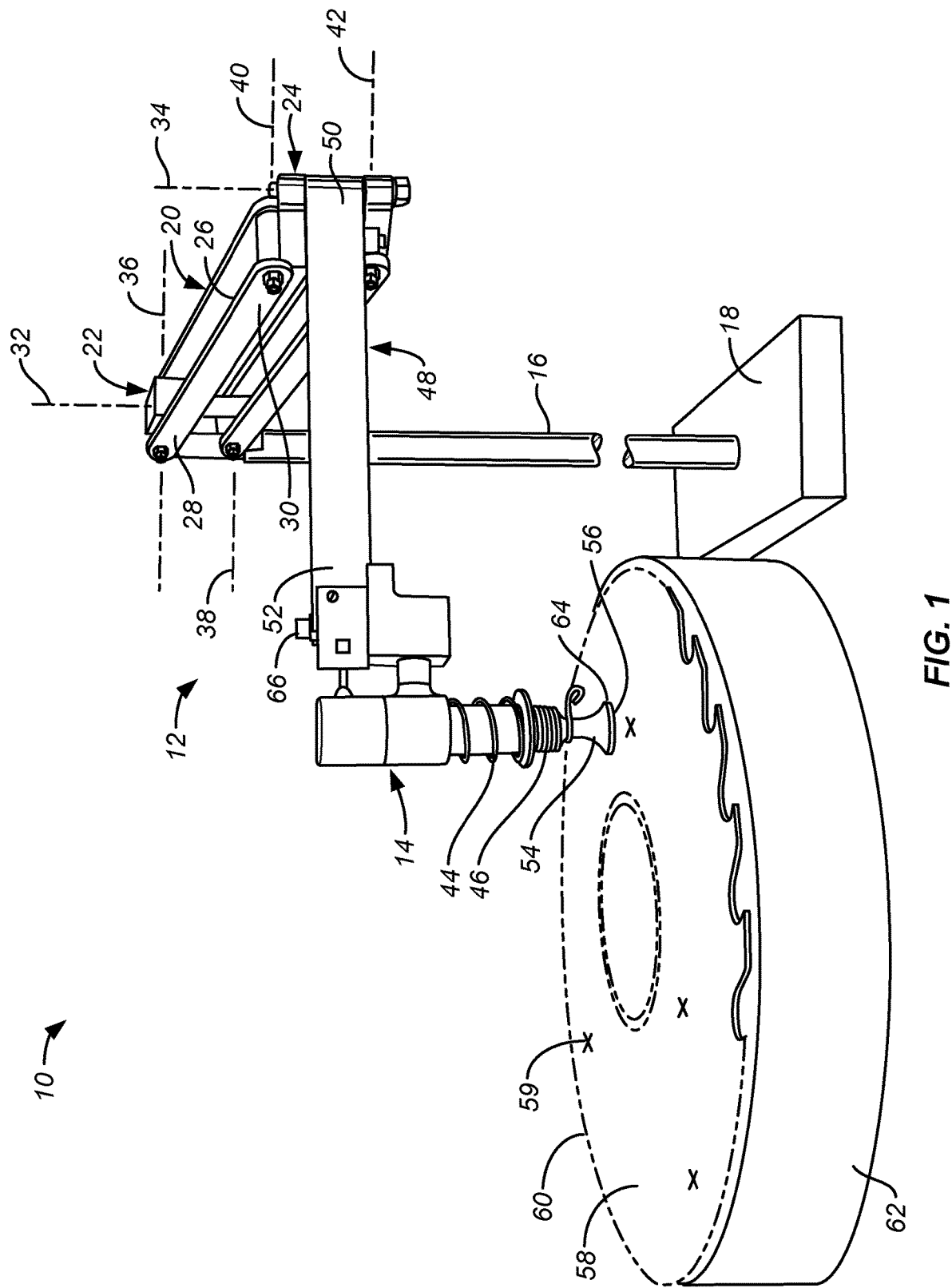
FIG. 1 is an overall perspective view showing a sawbenching assembly including a hammer assembly at an outer end of an articulated tool arm, the hammer assembly having a user-actuated hammer shown positioned adjacent a sawblade supported by an anvil.

The following description will typically be with reference to specific structural embodiments and methods. It is to be understood that there is no intention to-be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

One of the problems with manual sawbenching using a handheld hammer is that is not only tiring but also can result in repetitive stress injury. One aspect of the invention is the recognition that some of the problems associated with manual sawbenching using a handheld hammer may be reduced or eliminated by replacing the handheld hammer with a tool-arm-supported hammer assembly having a user actuated, power driven hammer. The hammer assembly would be supported by the tool arm, placed in position and actuated causing the hammer to impact the sawblade at each noted location needing reworking.

FIG. 1 is an overall perspective view showing an example of a sawbenching assembly 10. Sawbenching assembly 10 includes an articulated tool arm 12 and a hammer assembly 14. Articulated tool arm 12 includes a tool arm support 16 mounted to a support member 18 that is a generally horizontal member, an inclined member and/or an overhead member. In this example, support member 18 is shown as a horizontal surface, typically a tabletop or a flooring surface. Support member 18 could also be a vertical or inclined surface, such as a wall, or an overhead surface, such as a ceiling. Articulated tool arm 12 includes a scissors linkage arm 20 having first and second pivot joints 22, 24 connected by two sets of parallel arms 26 at the first and second ends 28, 30 of the parallel arms 26. The parallel arms 26 of scissors linkage arm 20 can rotate about a first (generally vertical) axis 32 through the first pivot joint 22. As is conventional with scissors linkage arms, the first and second ends 28, 30 are mounted, in this example to the first and second pivot joints 22, 24, for movement about generally horizontal axes 36, 38, 40, 42. In this way second pivot joint 24 can rotate about a first axis 32 and move upwardly and downwardly over an arc while maintaining the preferably generally vertical orientation of second axis 34.

Articulated tool arm 12 also includes a forearm 48 mounted to second pivot joint 24 at an inner end 50 of the forearm for pivotal movement about a second axis 34, also a generally vertical axis in this example. The orientation of second axis 34 remains constant as the second pivot joint 24 moves upwardly and downwardly. Articulated tool arm 12 can be similar to the articulated tool arm sold by Ergonomic Tool Arms, LLC of Doylestown, Pa. as model PA815-DF.

Figure 2:
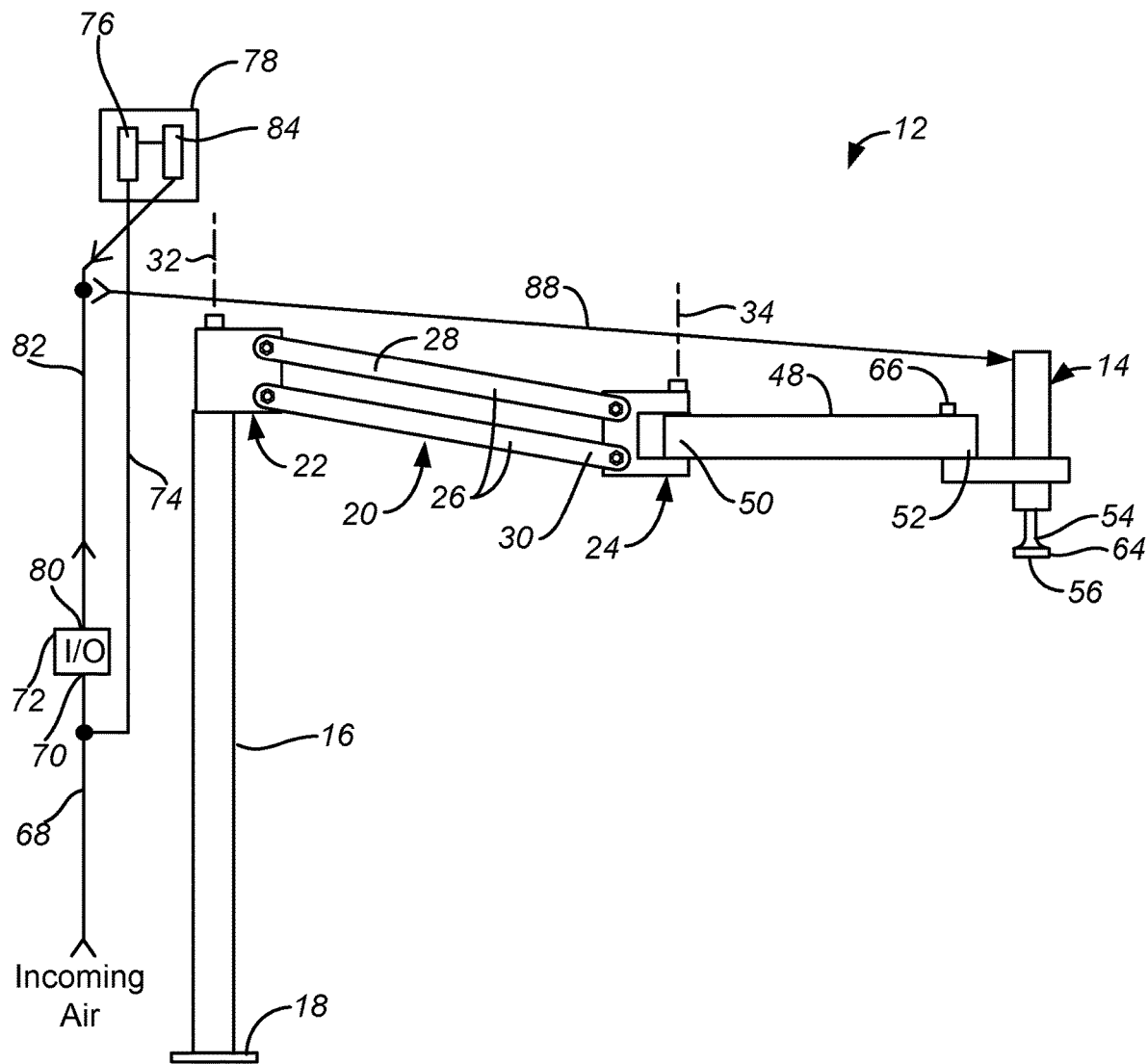
FIG. 2 is a somewhat simplified view of the sawbenching assembly of FIG. 1 together with control lines, power lines and control components used to actuate the hammer.

Referring now also to FIG. 2, hammer assembly 14 is mounted to an outer end 52 of forearm 48. Hammer assembly 14 includes a hammer 54 having an impact surface 56 placeable on the surface 58 of a sawblade 60, the sawblade supported by an anvil 62. As discussed below, surface 58 of sawblade 60 is checked for unevenness and locations 59 of unevenness are noted, typically using a straight edge to find the locations 59 and placing marks on surface 58 at the locations. Impact surface 56 of hammer 54 is positioned by the operator at the noted locations 59 on surface 58 to be reworked, several of which are indicated in FIG. 1. In this example sawblade 60 is a circular saw blade with typical diameters of 6 inches to 4 feet. In some examples sawblade 60 being worked on can be a bandsaw sawblade.

Impact surface 56 can be and typically is slightly convex. In one example impact surface 56 is semi-spherical extending from the lower edge 64 of hammer 54 and defines an included angle of about 5°. The included angle chosen can differ depending on the sawblade 60 being reworked. Typically the included angle is more aggressive, that is defines a greater included angle creating a less-flat impact surface, for thicker saws and less aggressive, creating a more-flat impact surface, for thinner saws. In one embodiment, the user can grind the impact surface 56 to the desired angle. In other embodiments, the user can select a particular hammer 54 that has a particular angle and is appropriate for the thickness and/or material of the sawblade 60. Hammer assembly 14 also includes a user-controlled actuator 66 (e.g., a button, switch, or the like, etc.) which when depressed causes impact surface 56 of hammer 54 to strike surface 58 of sawblade 60 at a noted location 59. Hammer assembly 14, including hammer 54 and impact surface 56 can be similar to an Air Boss planishing hammer sold by Air Boss of America Corporation of Newmarket, Canada, but with the impact surface 56 modified as discussed below. In an embodiment, the hammer assembly 14 can include one or more springs 44, 46 that absorb recoil and/or supply additional force.

In use, the operator places a sawblade 60 on anvil 62. The sawblade 60 is then checked for unevenness locations 59, typically using a straight edge. Areas of unevenness are marked on surface 58 as noted locations 59. The operator then moves hammer assembly 14 so that it overlies a noted location 59 and positions impact surface 56 against surface 58 of sawblade 60 at the chosen noted location 59. The operator then operates actuator 66 causing impact surface 56 of hammer 54 to strike the sawblade 60 at the chosen noted location 59.

The surface 58 at the chosen noted location 59 is then checked to see if the unevenness has been eliminated or sufficiently reduced, again typically using a straight edge. This process is repeated until the desired surface character for sawblade 60 is achieved. In some examples instead of continuing to work at the same noted location until the desired level of flatness is achieved, a number of different noted locations can be reworked once followed by checking the reworked noted locations for flatness. Those noted locations needing additional work would then be worked on using hammer assembly 14.

FIG. 2 is a somewhat simplified view of the Sawbenching assembly of FIG. 1 together with control components including a pneumatic system and/or alternately an electrical system. Compressed air is provided to a first line 68 to supply compressed air to an inlet 70 of a three-way valve 72. The compressed air provided to the first line 68 can be directly from a source or it can be regulated. In one embodiment the incoming air is regulated by a regulator (not illustrated) at approximately 80 psi.

A second line 74 provides compressed air from the first line 68 to a regulator 76 that is attached to a pneumatic block 78. The regulator 76 and the pneumatic block 78 of FIG. 2 are merely example illustrations. For example, the regulator 76 and/or the pneumatic block 78 can be directly or indirectly attached to any portion of the articulating tool arm 12. The regulator 76 controls the amount of air and the air pressure of air within air cylinder 84. The air cylinder 84 is also connected to the pneumatic block 78 at one end, so as to be able to receive the air pressure from the regulator 76. Other portions of the air cylinder 84 can be connected to any part of the articulating tool arm 12. In one embodiment, the air cylinder 84 can be implemented to apply a downforce to the parallel arms 26. In such an embodiment, the air cylinder 84 can be mounted to a component embodying the first and second pivot joints 22, 24, and to a portion of the parallel arms 26. Air cylinder 84 can include a piston that operates using air pressure, such that as air pressure is increased one or more of the parallel arms are pulled in the upward direction and/or pushed in the downward directions and such that as the air pressure is decreased one or more of the parallel arms are pulled in the upward direction and/or pushed in the downward direction. For example, the piston of the air cylinder 84 could be mounted to a portion of the component embodying the first and second pivot joints 22, 24 and an external portion of the air cylinder 84 can be mounted to one or more of the parallel arms 26. As the air pressure in the air cylinder increases, the piston of the air cylinder 84 extends in a downward direction and the exterior of the air cylinder 84 is pushed in an upward direction and because it is attached to one or more of the parallel arms 26, the parallel arms 26 receive an upward force. This upward force, depending on the level of air pressure, can completely move the parallel arms 26 and the components attached thereto in an upward direction or it can provide assistance in moving the parallel arms 26 in the upward directions.

Additionally, as the air pressure of the air cylinder 84 decreases, the movement of the piston can provide a downward assisting force to the parallel arms 26. This can help the user to apply a continuous downward force to the hammer assembly 14 as it actuates the hammer 54. In this example embodiment, the downward force can be applied to the hammer assembly 14 as the user depresses actuator 66. As a result, additional downward force assistance is provided to the user as the user is causing the hammer 54 to actuate and impact the sawblade 60. Portions of this structure can be implemented using, for example, assisted arm lifts from Ergonomic Tool Arms, LLC, of Doylestown, Pa. (e.g., model PA506).

Essentially, the incoming air is feed into the regulator 76 and the regulator allows the appropriate amount of air to fill the air cylinder 84. The pneumatic block 78 is a standard pneumatic block that allows air to flow between the regulator 76 and the air cylinder 84. A person of ordinary skill in the art will understand that many different combinations of regulators, pneumatic blocks and cylinders can be implemented as pneumatic block 78, regulator 76 and air cylinder 84. The regulator may be set to a user adjustable regulator or a non-user adjustable regulator. Further, the regulator 76 can be a two-way regulator that allows for bleeding of air from the air cylinder 84.

Actuator 66 is electrically connected to a three-way valve 72, so that when depressed, three-way valve 72 opens up and allows compressed air to pass from the first line 68, through inlet 70 and then through outlet 80 into a third line 82. Note that the electrical connection between the actuator 66 and the three-way valve 72 is not illustrated. The electrical connection may be a wired connection or a wireless connection or it may be any other type of connection. An outlet of air cylinder 84 is also connected to the third line 82. The third line 82 is connected to one end of a fourth line 88. The other end of the fourth line 88 is connected to the hammer assembly 14. As illustrated in FIG. 2, when the three-way valve 72 opens up, the compressed air that flows through the three-way valve 72 is combined with compressed air output from the air cylinder 84, and then the combined compressed air flows through the fourth line 88 to drive the hammer assembly 14. This causes the actuation of hammer 54 causing impact surface 56 to strike surface 58 of sawblade 60 at a noted location 59. In some examples hammer assembly 14 is designed to repeatedly hammer the sawblade 60 so long as actuator 66 is depressed. In other examples hammer assembly is constructed to impact the sawblade 60 a limited number of times, which could be once, when actuator 66 is depressed.

To summarize the actuation of the hammer 54, the following operations are performed. While the actuator 66 is not depressed, the incoming air on the first line 68 is feed to the second line 74 and into the regulator 76 and eventually the air cylinder 84. When the actuator 66 is depressed, the three-way valve 72 opens up and compressed air from both (i) the three-way valve 72 and (ii) the air cylinder 84 is combined and feed to the third line 82 and then to the fourth line 88 in order to drive the hammer assembly 14. In an embodiment, the hammer assembly 14 will require approximately 80 psi or more for proper operation. The combination of the air pressure from the incoming air (e.g., approximately 80 psi) and the air pressure from the air cylinder (e.g., approximately 20 psi) will ensure that the hammer assembly 14 receives sufficient air pressure to operate the hammer 54.

This pneumatic assembly illustrated in FIG. 2 is one of many possible pneumatic configurations. For example, a foot petal (not illustrated) may replace actuator 66 or may be used in conjunction with the actuator 66. Additionally, the pneumatic assembly may be replaced with an electrical assembly, such that the hammer assembly 14 is driven electrically, rather than pneumatically. Other variations will be apparent to a person of ordinary skill in the art. Furthermore, the actuator 66 can be placed at a location of the forearm 48 that is convenient to the hand of the user who is operating the sawbenching assembly 10 (e.g., an outer end of the forearm 48, an inner end of the forearm 48, etc.). For safety reasons, two actuators 66 can be placed on opposing locations on the forearm 48 or other portions of the sawbenching assemble 10, such that both actuators 66 must be depressed in order to drive the hammer assembly 14.

The above descriptions may have used terms such as above, below, top, bottom, over, under, et cetera. These terms may be used in the description and claims to aid understanding what is being disclosed and not used in a limiting sense.

While implementations of the technology are disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the technology disclosed and the scope of the following claims. For example, in some embodiments, hammer assembly 14 can be mounted directly to tool arm 12 at second pivot joint 24 when the flexibility provided by the reach of forearm 48 is not needed.

One or more elements of one or more claims can be combined with elements of other claims.

Any and all patents, patent applications and printed publications referred to above are incorporated by reference.

What is claimed is:

1. A sawbenching assembly for reworking a sawblade supported by an anvil to flatten the sawblade, the sawbenching assembly comprising:
   an articulated tool arm comprising:
      a tool arm support; and
      a scissors linkage arm having first and second ends, the first end pivotally connected to the tool arm support for rotation about a first axis, and the second end movable generally vertically;
   a user-operated actuation device connected to the articulated tool arm; and
   a hammer assembly pivotally connected to the second end of the scissors linkage arm for rotation about a second axis and for generally vertical movement with the second end of the scissors linkage arm, the hammer assembly having a user-actuated hammer with an impact surface positionable at chosen positions on the sawblade by three-dimensional user manipulation of the hammer assembly supported by the articulated tool arm,
   wherein the user-actuated hammer is actuated in response to a user engaging the user-operated actuation device.

2. The sawbenching assembly according to claim 1, wherein the articulated tool arm comprises a forearm having an outer end and an inner end, the hammer assembly being mounted to the outer end, the inner end being pivotally connected to the second end of the scissors linkage arm, and the user-operated actuation device being located at the outer end of the forearm.

3. The sawbenching assembly according to claim 1, wherein the tool arm support is connected to a chosen one of a generally horizontal member, an inclined member and an overhead member.

4. The sawbenching assembly according to claim 1, wherein the first and second axes are both generally vertical axes.

5. The sawbenching assembly according to claim 1, wherein the scissors linkage arm comprises two pairs of parallel arms.

6. The sawbenching assembly according to claim 1, wherein the hammer assembly is supported by the articulated tool arm through a forearm.

7. The sawbenching assembly according to claim 1, wherein the impact surface is a convex surface.

8. The sawbenching assembly according to claim 1, wherein the hammer assembly is pneumatically driven by a pneumatic system.

9. The sawbenching assembly according to claim 8, wherein the user-operated actuation device is electrically connected to a valve of the pneumatic system.

10. The sawbenching assembly according to claim 9, wherein the valve of the pneumatic system allows compressed air to pass therethrough and drive the user-actuated hammer of the hammer assembly in response to the user depressing a button on the user-operated actuation device.

11. The sawbenching assembly according to claim 10, further comprising an air cylinder that, in response to the user depressing the button on the user-operated actuation device, provides at least a portion of compressed air that drives the user-actuated hammer of the hammer assembly.

12. The sawbenching assembly according to claim 1, wherein the hammer assembly is electrically driven.

13. A sawbenching assembly for reworking a sawblade supported by an anvil to flatten the sawblade, the sawbenching assembly comprising:
   an articulated tool arm comprising:
      a tool arm support;
      a scissors linkage arm assembly comprising first and second pivot joints connected by parallel arms at first and second ends of the parallel arms;
      the first and second pivot joints defining first and second generally vertical pivot axes;
      the first pivot joint mounted to the tool arm support;
      the parallel arms rotatable about the first pivot axis;
      the second ends of the parallel arms movable in a generally vertical direction while maintaining a generally vertical orientation of the second pivot axis;
      a forearm having an outer end and an inner end mounted to the second pivot joint for generally vertical movement with the second pivot joint and rotation about the second pivot axis; and
      a user-operated actuation device connected to the articulated tool arm; and
   a hammer assembly mounted to and supported by the articulated tool arm at the outer end of the forearm, the hammer assembly having a user-actuated hammer with a convex impact surface positionable at chosen positions on the sawblade by three-dimensional user manipulation of the hammer assembly supported by the articulated tool arm,
   wherein the user-actuated hammer is actuated in response to a user engaging the user-operated actuation device.

14. The sawbenching assembly according to claim 13, wherein the user-operated actuation device is connected to the forearm.

15. The sawbenching assembly according to claim 13, wherein the hammer assembly is pneumatically driven by a pneumatic system.

16. The sawbenching assembly according to claim 15, wherein the user-operated actuation device is electrically connected to a valve of the pneumatic system.

17. The sawbenching assembly according to claim 16, wherein the valve of the pneumatic system allows compressed air to pass therethrough and drive the user-actuated hammer of the hammer assembly in response to the user depressing a button on the user-operated actuation device.

18. The sawbenching assembly according to claim 17, further comprising an air cylinder that, in response to the user depressing the button on the user-operated actuation device, provides at least a portion of compressed air that drives the user-actuated hammer of the hammer assembly.

19. The sawbenching assembly according to claim 13, wherein the hammer assembly is electrically driven.

20. A sawbenching method for reworking a sawblade to flatten the sawblade, the method comprising:
   placing a sawblade on a support surface of an anvil;
   checking the sawblade for any unevenness;

noting a location of an unevenness;
accessing a sawbenching assembly, the sawbenching assembly comprising an articulated tool arm and a hammer assembly,
   the articulated tool arm comprising a tool arm support, and a scissors linkage arm having first and second ends, the first end pivotally connected to the tool arm support for rotation about a first axis, and the second end movable generally vertically, and
   the hammer assembly pivotally connected to the second end of the scissors linkage arm for rotation about a second axis and for generally vertical movement with the second end of the scissors linkage arm, the hammer assembly having a user-actuated hammer with an impact surface positionable at chosen positions on the sawblade by three-dimensional user manipulation of the hammer assembly supported by the articulated tool arm;
positioning the user-actuated hammer at the noted location on the sawblade by manipulation of the articulated tool arm with a weight of the hammer assembly being at least partially supported by the articulated tool arm;
actuating the user-actuated hammer causing the user-actuated hammer to strike the sawblade at the noted location;
rechecking the sawblade at the noted location for any improvement in the unevenness; and
repeating the positioning, actuating and rechecking as needed.

\* \* \* \* \*